United States Patent
Parks et al.

(10) Patent No.: US 10,548,305 B2
(45) Date of Patent: Feb. 4, 2020

(54) SPIDER TRAP

(71) Applicant: SpiderTek, LLC, Rolla, MO (US)

(72) Inventors: Jennifer Lynn Parks, Salem, MO (US); William Van Dover Stoecker, Rolla, MO (US)

(73) Assignee: Spidertek, LLC, Rolla, MO (US)

( * ) Notice: Subject to any disclaimer, the term of this patent is extended or adjusted under 35 U.S.C. 154(b) by 455 days.

(21) Appl. No.: 14/456,101

(22) Filed: Aug. 11, 2014

(65) Prior Publication Data

US 2015/0047250 A1     Feb. 19, 2015

Related U.S. Application Data (60) Provisional application No. 61/867,273, filed on Aug. 19, 2013.

(51) Int. Cl.
*A01M 1/14* (2006.01)
*A01M 1/10* (2006.01)

(52) U.S. Cl.
CPC .............. *A01M 1/14* (2013.01); *A01M 1/103* (2013.01); *Y10T 156/1051* (2015.01)

(58) Field of Classification Search
CPC .......... A01M 1/14; A01M 1/103; A01M 1/10; A01M 1/145; Y10T 156/10; Y10T 156/1051
USPC ....................................................... D22/122
See application file for complete search history.

(56) References Cited

U.S. PATENT DOCUMENTS

| | | | | |
|---|---|---|---|---|
| 1,103,259 A | * | 7/1914 | Buckley | A01M 1/14 43/115 |
| 2,177,670 A | * | 10/1939 | Peirson | A01M 1/02 43/107 |
| 2,372,747 A | * | 4/1945 | Sullivan | A01M 1/10 229/115 |
| D233,665 S | * | 11/1974 | Neugebauer | A01M 1/145 D22/122 |

(Continued)

FOREIGN PATENT DOCUMENTS

| | | | |
|---|---|---|---|
| CH | 705009 A2 * | 11/2012 | .............. A01M 1/14 |
| DE | 29607701 U1 * | 7/1996 | .............. A01M 1/14 |

(Continued)

OTHER PUBLICATIONS

Anderson, P. 1982. Necrotizing spider bites. Practical therapeutics. 26(3): 198-203.

(Continued)

*Primary Examiner* — Magdalena Topolski
*Assistant Examiner* — Morgan T Barlow
(74) *Attorney, Agent, or Firm* — Faegre Baker Daniels LLP (57) ABSTRACT

A trap for spiders and other insects is provided. The trap is especially useful for catching brown recluse (*Loxosceles reclusa*) spiders, whose bites are extremely harmful. The trap need not utilize chemical attractants or other behavior-modifying environmentally harmful chemicals, or food bait or lights to attract the spiders. The internal volume of the trap can be shaped as a triangular prism with open triangular faces and openings in the front. At least a portion of the floor is coated with bug adhesive. The trap can be packaged as a kit including a flat sheet that can be folded a three-dimensional shape. The fronts can include spaced vertical struts. Methods and kits for making using the traps are also provided.

13 Claims, 7 Drawing Sheets

(56) References Cited

U.S. PATENT DOCUMENTS

| | | | | |
|---|---|---|---|---|
| 3,864,867 | A | * | 2/1975 | Dry .................... A01M 1/14 43/131 |
| 3,913,259 | A | * | 10/1975 | Nishimura ............ A01M 1/02 43/114 |
| D240,034 | S | * | 5/1976 | Takimoto ................ D22/122 |
| 4,044,495 | A | * | 8/1977 | Nishimura ............ A01M 1/02 43/114 |
| 4,048,747 | A | | 9/1977 | Shanahan |
| 4,052,811 | A | | 10/1977 | Shuster |
| 4,214,400 | A | * | 7/1980 | Patmore ............. A01M 1/103 43/121 |
| 4,244,134 | A | | 1/1981 | Otterson |
| 4,324,062 | A | | 4/1982 | Schneider |
| 4,608,774 | A | | 9/1986 | Sherman |
| 4,819,371 | A | | 4/1989 | Cohen |
| 5,048,224 | A | * | 9/1991 | Frisch .................. A01M 1/02 43/107 |
| 5,303,501 | A | * | 4/1994 | Seemann ............ A01M 1/026 43/114 |
| D346,847 | S | * | 5/1994 | Barbanera ......... A01M 1/145 D22/125 |
| 5,396,729 | A | * | 3/1995 | Vejvoda .............. A01M 1/02 43/114 |
| 5,513,465 | A | | 5/1996 | Demarest |
| 5,572,825 | A | | 11/1996 | Gehret |
| 5,649,385 | A | | 7/1997 | Acevedo |
| 6,516,558 | B1 | * | 2/2003 | Lingren ................ A01M 1/02 43/107 |
| 6,786,001 | B1 | | 9/2004 | Piper |
| D521,102 | S | * | 5/2006 | Hoyes ................. A01M 1/24 D22/122 |
| 7,676,985 | B1 | * | 3/2010 | Perkins .............. A01M 1/026 43/114 |
| 7,748,159 | B1 | * | 7/2010 | Wenner ................ A01M 1/24 43/114 |
| 8,240,081 | B2 | * | 8/2012 | Cuellar Bernal ..... A01M 1/145 43/107 |
| 8,341,873 | B2 | | 1/2013 | Frisch |
| 8,793,927 | B2 | * | 8/2014 | Winkler .............. A01M 1/14 43/107 |
| 2005/0138858 | A1 | | 6/2005 | Lyng |
| 2005/0279016 | A1 | | 12/2005 | Williams et al. |
| 2006/0283076 | A1 | * | 12/2006 | Chambers ............ A01M 1/02 43/114 |
| 2008/0086932 | A1 | * | 4/2008 | Cook .................... A01M 1/02 43/114 |
| 2009/0293342 | A1 | * | 12/2009 | Winkler ................ A01M 1/02 43/114 |
| 2010/0154290 | A1 | * | 6/2010 | Fisher .................. A01M 1/02 43/114 |
| 2012/0167309 | A1 | * | 7/2012 | Heidorn .............. A01M 1/103 5/691 |
| 2012/0285076 | A1 | * | 11/2012 | Banfield ............. A01M 1/026 43/123 |
| 2013/0067796 | A1 | * | 3/2013 | Dong .................... A01M 1/14 43/109 |
| 2013/0111802 | A1 | * | 5/2013 | Oehlschlager ........ A01M 1/14 43/114 |
| 2013/0312313 | A1 | * | 11/2013 | Lefkowitz ............ A01M 1/02 43/114 |
| 2013/0312314 | A1 | * | 11/2013 | Greening ............ A01M 1/145 43/114 |
| 2014/0000151 | A1 | * | 1/2014 | Cowen .................. A01M 1/02 43/107 |
| 2014/0259879 | A1 | * | 9/2014 | Logsdon ............ A01M 1/2011 43/114 |
| 2016/0066556 | A1 | * | 3/2016 | Banfield ............. A01M 1/145 43/113 |
| 2017/0006851 | A1 | * | 1/2017 | Doman ................. A01M 1/14 |
| 2017/0223944 | A1 | * | 8/2017 | Bost ..................... A01M 1/14 |

FOREIGN PATENT DOCUMENTS

| | | | | |
|---|---|---|---|---|
| DE | 102009043826 | A1 | * | 2/2011 ............. A01M 1/02 |
| EP | 0659339 | B1 | | 6/1995 |
| EP | 2210488 | A2 | * | 7/2010 ............. A01M 1/14 |
| EP | 2347759 | A2 | | 7/2011 |
| FR | 2351595 | A1 | * | 12/1977 ............. A01M 1/14 |
| GB | 1507696 | A | * | 4/1978 ............. A01M 1/02 |
| GB | 2180135 | A | * | 3/1987 ............. A01M 1/14 |
| JP | 02086725 | A | * | 3/1990 ............. A01M 1/14 |
| JP | 05236858 | A | * | 9/1993 ............. A01M 1/02 |
| JP | H0675178 | U | * | 10/1994 ............. A01M 1/14 |
| WO | WO9615664 | | | 5/1996 |
| WO | WO-9734471 | A1 | * | 9/1997 ............. A01M 1/14 |
| WO | WO-2013115719 | A1 | * | 8/2013 .......... A01M 1/2011 |
| WO | WO-2014115246 | A1 | * | 7/2014 ............. A01M 1/14 |
| WO | WO-2015129976 | A1 | * | 9/2015 ............. A01M 1/14 |

OTHER PUBLICATIONS

Big-H Trap bighproducts.com/traps.htm, downloaded Jul. 9, 2013.
Brown Recluse Spider Traps p. 5, www.brown-recluse.com/ Downloaded Jul. 9, 2013.
Catchmaster Catalog pages, Catchmaster.com, Downloaded Jul. 19, 2013.
Catchmaster Glue Boards, catchmasterglueboards.com downloaded Jul. 18, 2013.
Elzinga, R. J. 1977. Observations on the longevity of the brown recluse spider, Loxosceles reclusa Gertsch and Mulaik. J. Kansas Entom. Soc. 50(2): 187-188.
Fischer MA, et al. 2005. Microhabitats Occupied by Loxosceles intermedia and Loxosceles laeta (Araneae: Sicariidae) in Curitiba, Paraná, Brazil. J. Med. Ent. 42(5): 756-765.
Gladney, W. J., and C. C. Dawkins. 1972. Insecticidal tests against the brown recluse spider. J. Econ. Entomol. 65: 1491-1493.
Hagstrum, DW et al 1994. Early detection of insects in stored wheat using sticky traps in bin headspace and prediction of infestation level. Environmental Entomology 23:1241-4.
Hite, JM et al. 1966. The biology of the brown recluse spider. Arkansas Experiment Station, Bulletin 711, p. 1-26.
Tomcat Glue Boards, www.tomcatbrand.com/glue_boards.html, downloaded Aug. 4, 2014.
Vetter, RS and Rust, MK, Refugia Preferences by the Sider Loxosceles reclusa and Loxosceles Laeta (Araneae: Sicariidae), J. Med. Entomol. 45(1)36-41, 2008.
Victor Holdfast Glue Trap, www.tritonpestcontrol.com/item--Victor-Holdfast-Glue-Trap-Mouse-Insect-M320-7, downloaded Jul. 18, 2013.
Norment, B. R. and T. L. Pate. 1968. Residual activity of diazinon and lindane for control of Loxosceles reclusa. J. Econ. Entomol. 61: 574-575.
Sandidge, J. S. 2003. Scavenging in brown recluse spiders. Nature 426: 30.
Sandige JS, Hopwood JL. 2005. Brown recluse spiders: A review of biology, life history and pest management. Transactions of the Kansas Academy of Science 108(3): 99-108.
Schenone, H., A. Rojas, H. Reyes, F. Villarroel, and G. Suarez. 1970. Prevalence of Loxosceles laeta in houses in central Chile. Am. J. Troup. Med. Hyg. 19: 564-567.
Stropa AA. 2010. Effect of architectural angularity on refugia selection by the brown spider, Loxosceles gaucho. Medical and Veterinary Entomology 24: 273-277.
Turner H, Firth D. 2012. Bradley-Terry Models in R: The BradleyTerry2 Package. Journal of Statistical Software 48(9): 1-21.
Vetter, RS et al. 2002. An infestation of 2,055 brown recluse spiders (Araneae: Sicariidae) . . . Clinical Infectious Diseases 39(6):948-951.
Zurek, L. 2005. Spiders and Scorpions. Kansas State University Agricultural Experiment Station and Cooperative Extension Service. MF-771: 1-3.
Catchmaster Mouse and Insect Glue boards, www.catchmaster.com/wpcproduct/mouse-insect-glue-boards/, downloaded Aug. 4, 2014.
PIC Mouse Glue Board, www.amazon.com/PIC-GMT-2F-Mouse-Board-2-Pack/dp/B0037Z1F9A, downloaded Sep. 5, 2014.

(56) References Cited

OTHER PUBLICATIONS

Schwarting, Holly N. et al. "Residual Effect of Insecticide Treatment Plus Use of Sticky Traps on Brown Recluse Spiders (Araneae: Sicariidae) on Two Surfaces". Journal of the Kansas Entomological Society. vol. 88, Issue 3. pp. 316-324. 2015.

* cited by examiner

SPIDER TRAP

CROSS-REFERENCE TO RELATED APPLICATIONS

This application claims priority to U.S. Provisional Patent Application No. 61/867,273 filed Aug. 19, 2013, which is incorporated herein to the extent not inconsistent herewith.

BACKGROUND

The brown recluse spider, *Loxosceles reclusa* (Araneae: Sicariidae), is a common household pest in the Midwestern United States. It is mainly nocturnal and is capable of inflicting a venomous bite. Its coloration ranges from light to dark brown with markings on the dorsal side of the cephalothorax. *L. reclusa* spiders have six eyes arranged in three pairs. They average about three-eighths of an inch (9.5 mm) in size.

Spider traps are known to the art, for example as described in U.S. Pat. Nos. 4,048,747, 4,052,811, 4,244,134, 4,324,062, 4,608,774, 4,819,371, 5,513,465, 5,572,825, 5,649,385, 6,786,001 8,341,873, US Patent Publication Nos. 20050138858 and 20050279016, EP Patent Publication No. EP2347759, and PCT Publication No. WO 9615664. Traps containing bait comprising double-stranded RNA for controlling brown recluse spiders are mentioned in EP Patent No. EP0659339, and described as box-shaped and made of a material such as corrugated cardboard with a sticky substance coating the material. At least one *Loxosceles* species prefers refuges that offer acute angles (Stropa 2010).

Glue-traps have been sold commercially for capture of not only arachnids but also flying insects, rodents, and reptiles. Glue-traps have also been used for estimating the population of beetle infestations (e.g., Hagstrum et al. 1994). In addition, glue-traps have been used to estimate brown recluse populations inside residential housing (Vetter et al. 2002). A search of the existing literature reveals no studies that compare spider trap designs, even though spider populations have been successfully estimated with glue-traps (Sandidge et al. 2005). Many such traps comprise behavior-altering chemicals such as pesticides and chemical attractants. Homeowners, however, are often deterred from using chemical pesticides due to possible health risks and environmental side effects.

Many insects are attracted to light, and traps for such insects utilizing light or food or other chemical attractants as bait have been described. However, brown recluse spiders prefer dark places, and many homeowners prefer not to attract human attention to such traps by using light.

There is a particular need for safe and consistent management for the brown recluse spider, *Loxosceles reclusa* Gertsch & Mulaik, a venomous spider found in large areas of central, eastern, and southern United States, and considered abundant in Kansas (Sandidge and Hopwood, 2005). This spider is a synanthrope and therefore is commonly found in association with human structures (Schenone et al., 1970). The brown recluse spider is venomous and, although bites are uncommon, when they do occur the bite may develop into a necrotic lesion where tissues around the bite break down, creating a slow-healing wound that may leave significant scarring (Anderson, 1982). Therefore, tolerance for brown recluse spiders in homes is very low and homeowners expect 100% control.

It is estimated that most homes in the area of brown recluse distribution are infested by these spiders, and that they are regularly transported to new homes in building materials or in items moved from other structures (Zurek, 2005). *L. reclusa* has adapted so well to human dwellings that populations can be quite large with one report documenting up to 2,055 brown recluse spiders collected from a 270 $m^2$ Kansas home in a mere six-month time period (Vetter and Barger, 2002).

The brown recluse presents challenges for pest control professionals because it is so difficult to eliminate from structures. There have been few studies conducted to test the efficacy of modern pesticides and treatment methods for brown recluse spider control and the studies that have been conducted often report inconsistent results (Sandidge and Hopwood, 2005). One of the reasons that *L. reclusa* is so difficult to eliminate from structures is because of their secretive nature. These spiders are nocturnal, webs are typically built in out-of-the-way areas that are rarely disturbed, including difficult to access areas; locations of spiders will differ with each infestation depending on many variables including the layout of the home, temperature and population size (Sandidge and Hopwood, 2005). Additionally, *L. reclusa* is known to feed on a wide range of insect and other arthropod prey and has been shown to readily feed on dead prey, including freshly killed, dead several months, and even prey killed with insecticides (Sandidge, 2003). They can also survive a long time without food or water. Brown recluse spiders have been shown to live up to ten months in a controlled setting with no food or water and up to six months with no food, water, or fresh air (Sandidge and Hopwood, 2005). In addition, these spiders are long-lived, with an average lifespan of 646 days for males and 794 days for females, under favorable conditions (Elzinga, 1977).

Attempted management of these spiders has included the use of various fumigants and aerosols, many having no data to show they were effective, and which were often applied haphazardly and excessively. Early pesticide trials were contradictory and a number of the chemicals considered somewhat effective or effective are now restricted or banned in the United States (Norment and Pate, 1968; Gladney and Dawkins 1972). For example, Hite et al. (1966) examined the efficacy of 13 topically applied chemicals, including lindane, diazinon, chlordane, malathion, and carbaryl. Of these tested chemicals only lindane, which has since been banned in the U.S., provided significant residual control of the spiders.

There is a need in the art for a trap for spiders and insects, and especially for the dangerous brown recluse spider, that does not use light as an attractant. There is also a need for such traps not containing chemical attractants or other chemical control substances. Because the brown recluse spider is an important arthropod pest in structures, good, safe, consistent control measures are needed in the form of improved methods for controlling their populations in indoor spaces.

All publications referred to herein are incorporated by reference for purposes of written description and enablement.

SUMMARY

A trap for spiders and other insects is provided herein that is especially useful for catching brown recluse (*Loxosceles reclusa*) spiders. In embodiments the trap does not comprise chemical attractants or other behavior-modifying environmentally harmful chemicals. In embodiments the trap does not comprise food bait. In embodiments, the trap does not use light to attract spiders or other insects.

Figure 1:
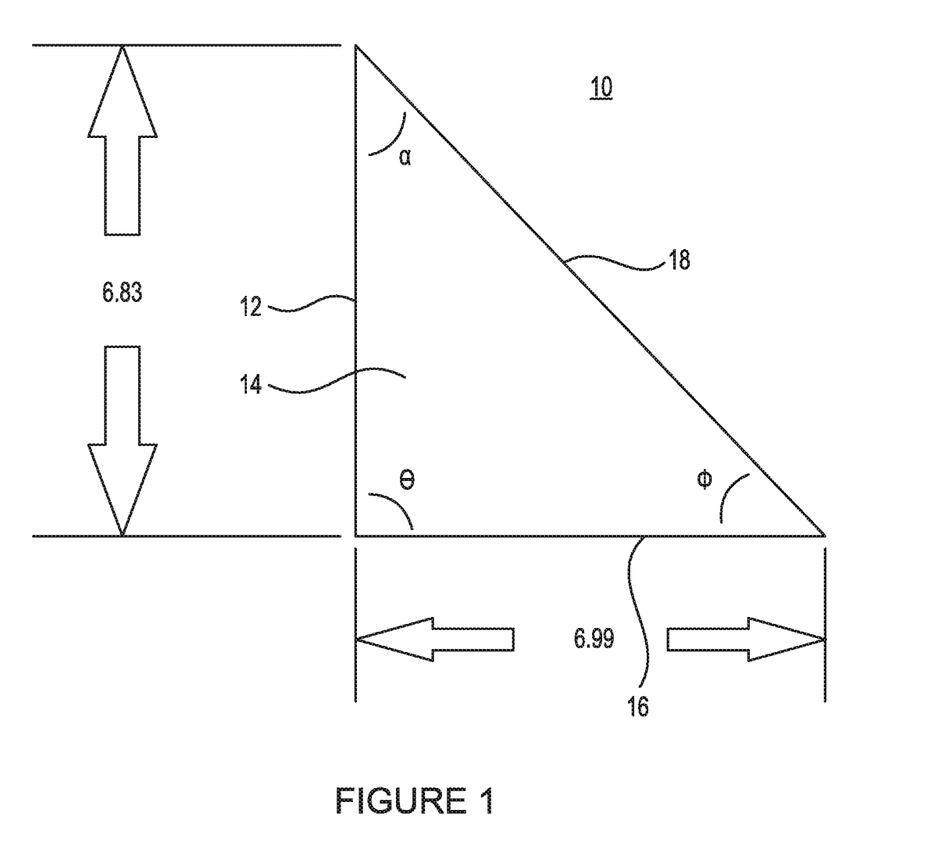
FIG. 1 shows a side view of the spider traps hereof.

In embodiments, the internal volume of the trap is shaped as a triangular prism as shown in FIG. 1 hereof, except that the triangular faces (sides) are open, i.e., are not solid faces. In embodiments, the triangular faces (sides) are solid, or one or more faces are solid with openings, therein, e.g., comprised of separate vertical struts. In other embodiments the trap is shaped as a pyramid. In other embodiments, the trap is shaped as a box. In embodiments at least one face of the spider trap is completely open. In embodiments, the front of the spider trap comprises openings and can be substantially open. In embodiments, one or more side walls of the trap extend beyond the shape formed by the internal volume of the trap. In embodiments the trap comprises at least one flat, planar wall or portion of a wall. In embodiments the trap comprises two parallel flat planar walls or portions of walls.

The spider trap comprises a floor, which in embodiments is rectangular, but can be any other shape. The floor, in embodiments, is disposed horizontally on the floor of a room or on a table or other object. The floor can be completely planar, or be wavy, stepped, or have any other regular or irregular surface features. In embodiments, the floor, back and front of the spider trap are all rectangular in shape.

The spider trap also comprises a back disposed at an angle θ to the floor. In embodiments angle θ is between about 80° and about 100°. The angle should be large enough, at least one inch (2.54 cm), to accommodate the height of a typical spider, but no greater than about 100° so as to be able to place to trap flush against a vertical surface, such as a wall, cabinet, etc. In an embodiment the angle between the bottom of the back and the back edge of the floor is about 90°.

Figure 3:
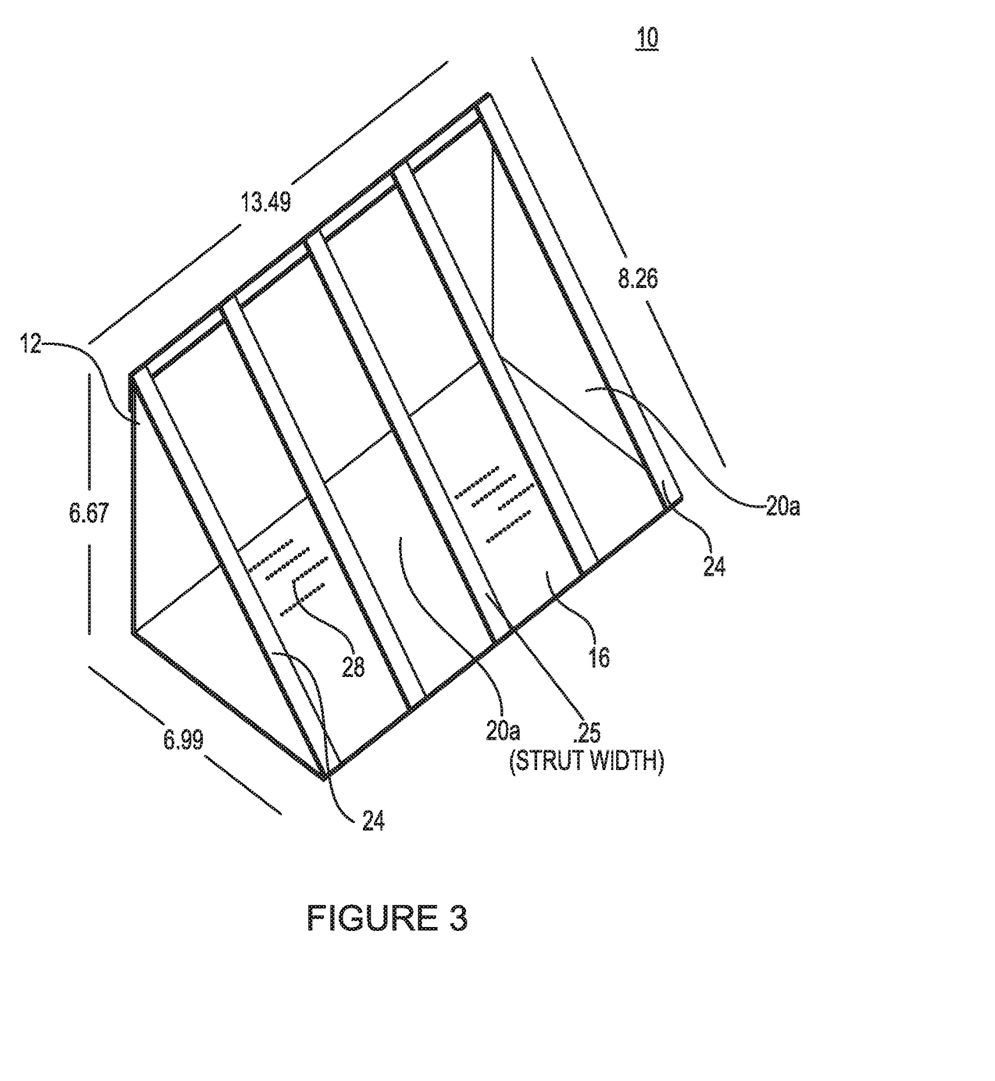
FIG. 3 shows a perspective view of a spider trap hereof having a vertical strut design.
Figure 4:
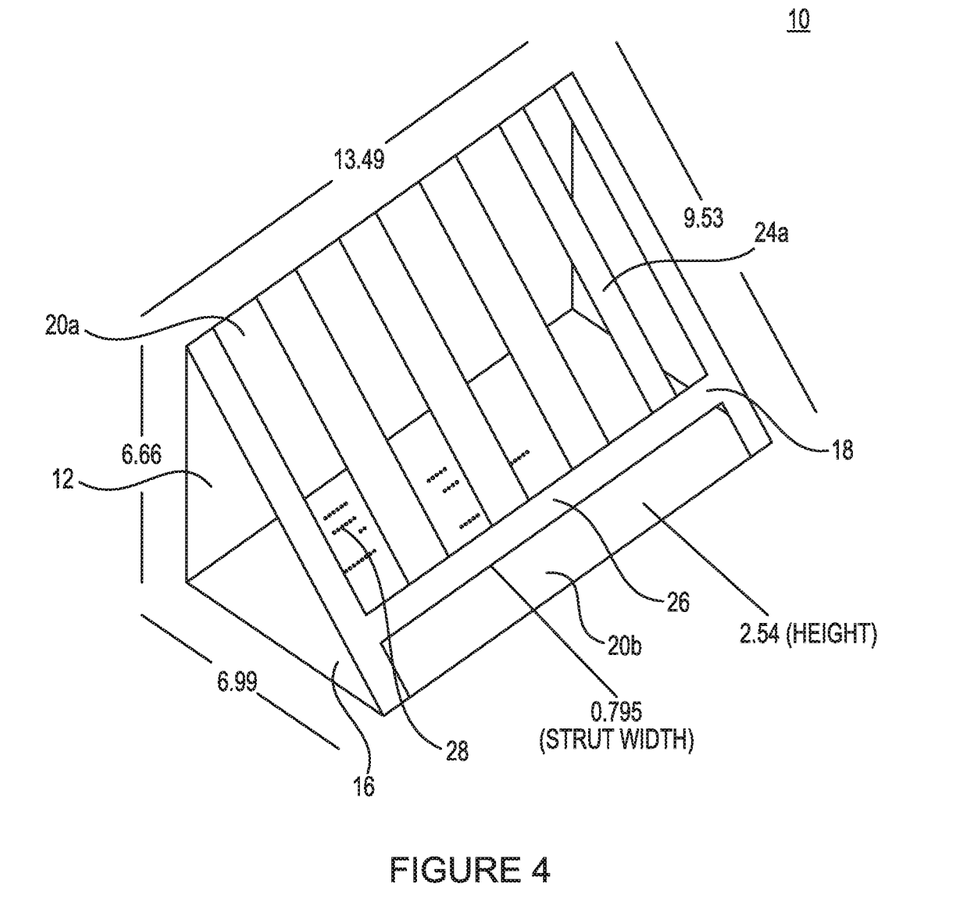
FIG. 4 shows a perspective view of a spider trap hereof having a vertical strut design with a horizontal bar at the bottom.

The spider trap also comprises a front disposed at an angle φ to the floor and an angle α to the back. The angle φ between the front and the floor should be large enough to allow spiders entry and small enough to keep dimensions on a compact size and in embodiments is between about 35° and about 55°. If the front is comprised of struts as shown in FIGS. 3 and 4, each strut is desirably at said angle φ to the floor. If the front additionally comprises a horizontal bar at the bottom of the struts as shown in FIG. 4, between the bottom of the struts and the front edge of the floor, the angle φ of the front with the floor is considered to be the angle of a notional line extending from the bottom of the horizontal bar to the front edge of the floor with the floor. The angle α between the top of the back and the top of the front should be between about 35° and about 55°. It should not be so large that compact trap size is adversely affected or so small that spiders are unable to gain entry. In embodiments, the front of the trap comprises one or more openings. In embodiments, the front of the trap is substantially open. The purpose of the opening(s) is to allow the spider to enter the trap from either the front or the sides of the trap. All walls of the trap can comprise openings sized and shaped so as to permit entry to spiders from any direction from which the spider approaches. The openings can be rectangular in shape, circular, arc-shaped, or any other regular or irregular shape desired.

At least a portion of the floor is covered with a bug adhesive capable of sticking to a spider leg as well as other body parts and is capable of substantially preventing disengagement of the spider therefrom. Bug adhesives such as those used in flypaper are well-known to the art and commercially available, e.g., available from Atlantic Glue and Paste and Glue, Brooklyn, N.Y., ISCA Technologies, Riverside, Calif., and Ningbo Yinzhou Hopson Chemical Industry Co. Ltd., Ningbo, China. The adhesive should retain its adherence properties for at least 3 months; it should be nontoxic to mammals, both pets and people; the MSDS (material safety data sheet) should be supplied with the adhesive and confirm lack of toxicity; and the adhesive should hold a spider fast after contact with any part of the spider.

The inventors have found that no spiders were caught on the vertical portions of commercial traps. Thus, while it does not appear to interfere with the effectiveness of the trap to provide bug adhesive on portions of the trap other than the floor, this is not necessary, and it is advantageous in terms of cost savings and ease of handling of the traps that bug adhesive not be coated on surfaces other than the floor of the trap.

Adhesive-coated surfaces of the trap can be covered with slick, peel-off paper for shipping and handling.

In an embodiment hereof, the inside of the trap is high enough to allow an adult *Loxosceles reclusa* with a leg span of up to 2.5 inches (6.35 cm) to walk inside if it is walking vertically along the wall and entering into the back of the trap without lowering itself in height to avoid touching the trap, and spacious enough to capture up to one dozen adult spiders. In embodiments, such traps hereof have a compact size, i.e., an internal volume between about 35 and about 50 cubic inches (about 573.5 to about 819.4 cubic cm), and a height of at least about 2.5 inches (6.35 cm).

In an embodiment hereof, the area of the trap floor is large enough to catch multiple spiders if spiders are not removed from the trap. In embodiments, traps hereof have a floor area between about 10 and about 24 square inches (about 64.5 to about 154.8 $cm^2$).

In embodiments such as that shown in FIG. 3 hereof, the traps have a front wall comprised of vertical struts, the struts have a width between about 0.15 and about 0.35 inches (about 3.8 to about 8.9 mm), wide enough to provide sufficient load-bearing capacity to support the front and back walls under normal use, but not so wide as to interfere with the spider's ability to enter the glue trap from the front of the trap between the struts.

In embodiments such as that shown in FIG. 4 hereof, the front of the trap has a horizontal bar wide enough to provide sufficient load-bearing capacity to support the front and back walls under normal use, e.g., between about 0.15 and about 0.35 inches (about 3.8 to about 8.9 mm).

In embodiments the walls and floor of the trap are fixedly attached to each other; in embodiments they are rotatably attached to each other so as to rotate through an angle of between about 40° and about 50°, and/or the walls can be removably attached to each other, such as by hinges, by a cord such as a cloth or plastic lacing, or by other fastening devices known to the art. They can also be rotatably connected to each other by being made of a flexible material capable of being folded to form a three-dimensional trap structure or portion thereof. In embodiments each wall of the trap is attached to another portion of the trap so as to form a single flat sheet that can be folded to make the three-dimensional trap. In embodiments. In embodiments, adjacent walls need not be fastened to each other if forces of friction or gravity or the buttressing forces of other walls or the floor will keep them in place during use, for example, in embodiments it may not be necessary to secure the front of the trap to the floor.

In embodiments, the spider trap is made from a material that is, or is made from, wood or wood products, e.g., natural wood, cardboard, including corrugated cardboard, paper, and/or chipboard. In embodiments at least some portions of the surfaces of the trap: the back and the struts are rough to provide a surface the spider can easily walk on.

Kits comprising trap components such as solid walls, fasteners, bug adhesive and instructions for their assembly are also provided herein. In embodiments, the trap is provided to consumers as a single foldable piece of material such as paper comprising tabs and slots, adhesive tabs or other attachment features known to the art for ease of assembly. Consumers can thus determine if they want an "open" (flat) trap or if they want to fold it over to prevent children and pets from contact with the bug adhesive, and manufacturers of the traps need only provide a single embodiment to serve both purposes.

Figure 7:
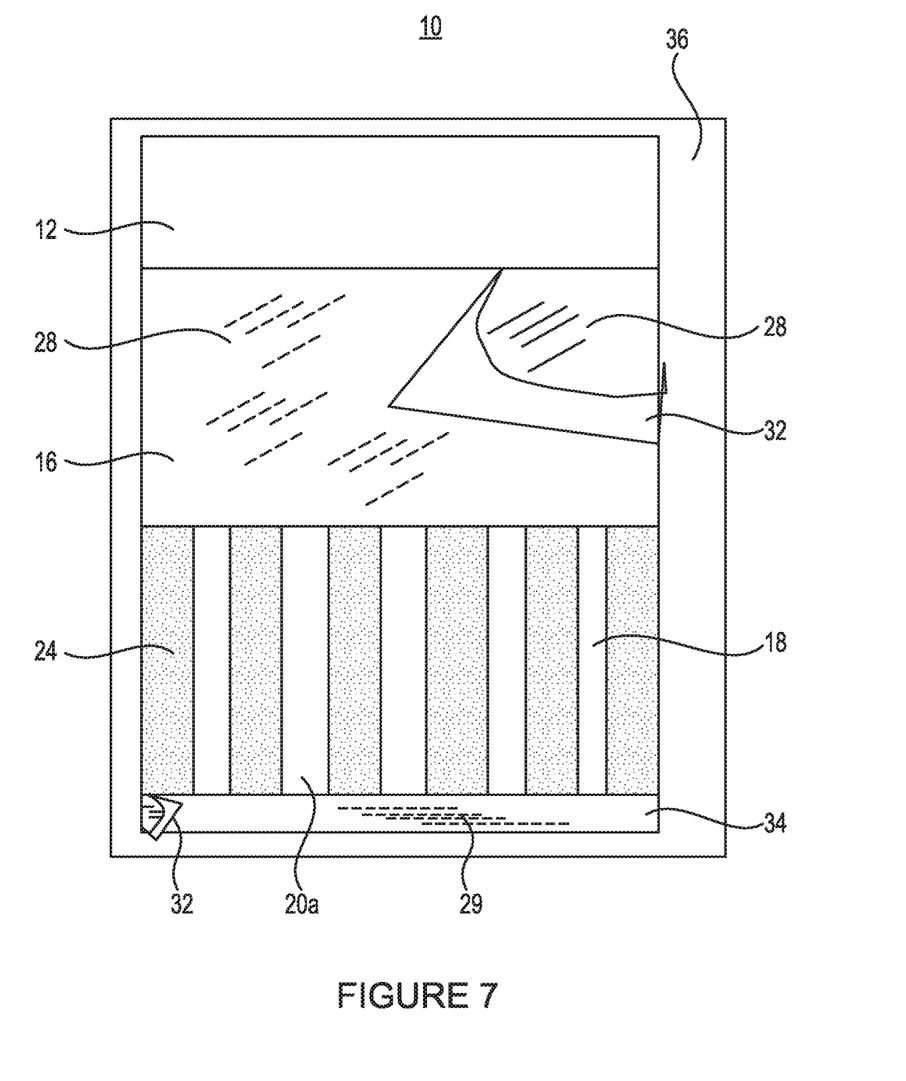
FIG. 7 illustrates a commercial version of the trap that can be packaged and sold in flat form and folded by the customer to a three-dimensional conformation.

In an embodiment, the trap is packaged for sale on a packaging board in the form of a single sheet as shown in FIG. 7. The trap comprises a back section, a floor section, a front section and a fold-over tab section. Bug adhesive is coated on the floor section of the trap and covered with peel-off paper. A contact adhesive is coated on the fold-over tab and covered with peel-off paper.

A method for making a spider trap having the shape of a triangular prism comprises: providing a floor having front and back edges; coating or partially coating the floor with a bug adhesive capable of sticking to a spider leg; providing a back having a top edge and a bottom edge, sized and shaped so as to be capable of being fastened to the back edge of the floor; fastening the bottom edge of the back to the back edge of the floor such that the back is disposed at an angle θ to the floor; providing a front having a top edge and a bottom edge, the front being sized and shaped to be attached to the top edge of the back; wherein the front comprises openings defined by a series of vertical struts, a series of vertical struts in combination with a horizontal strut disposed along the bottom of the struts, or a solid portion having an "X" or hourglass shape; fastening the top edge of the front to the front edge of the back so that the front forms an angle α with the back; and optionally fastening the bottom edge of the front to the front edge of the floor so that the front forms an angle φ with the floor.

A suitable adhesive can be coated on the floor or portions thereof, and/or other walls of the trap before or after the walls are attached to each other.

Embodiments of the traps hereof having internal volumes with other shapes can be made by methods analogous to those described above.

To use the single-sheet trap, the back section of the trap is folded over toward the center of the trap to form a vertical back, leaving the rest of the trap flat. The front section the trap is folded upward and inward toward the center to form the front of the trap, leaving the floor section flat. The tops of the front and back are brought together. The contact paper is removed from the fold-over tab on the front of the trap and the fold-over tab is folded downward and inward to stick to the outside top edge of the back.

In use, the trap is disposed in an area believed to be a brown recluse spider habitat and allowed to remain there until one or more brown recluse spiders have become stuck to the adhesive coating. To determine whether an area is likely to be a brown recluse spider habitat, the following factors need to be considered:

a. Usual geographical habitat: areas of the United States: from southeastern Nebraska through southern Iowa. Ill. and Indiana to southwestern Ohio. In the southern states, it is native from central Texas to western Georgia and north to Kentucky;

b. Preferred surfaces: cardboard, newspaper, lumber; and c. Local habitat: dark, undisturbed places such as shoes, inside dressers, in bed sheets of infrequently-used beds, in clothes stacked or piled or left lying on the floor, inside work gloves, behind baseboards and pictures, in toilets, and near sources of warmth when ambient temperatures are lower than usual; and nearby areas where they can wander in search of mates and prey items.

It is not necessary to bait the trap with food or other attractants.

Spider traps hereof made of biodegradable, non-toxic materials, along with spiders that have been trapped therein, can be left in place in wilderness settings or in urban and household environments can be disposed of with other biodegradable waste.

This disclosure also provides methods for controlling brown recluse spider populations in indoor spaces utilizing spider traps.

DETAILED DESCRIPTION

Definitions

A prism is a shape made of two parallel faces that are polygons of the same shape and sides that are parallelograms.

A triangular prism is a prism with triangular faces, e.g., as shown in FIG. 1.

A pyramid is a shape with a base that is a polygon and triangular sides.

The term "rectangular" as used herein includes square.

The term "vertical" as used herein with respect to trap walls means extending in an upward direction from the floor at any angle.

The term "back" as used herein with respect to the traps hereof refers to a wall having the least number of openings of any other wall of the trap.

The term "front" as used with respect to the traps hereof refers to a vertical wall which is approximately or directly opposite to the back wall if the trap has four or more faces, or if the trap has three faces, it can refer to either adjacent wall.

The term "floor" as used with respect to the traps hereof refers to a horizontal portion of the bottom of the trap.

The term "top," "bottom," "upward," "downward," "above" and "below" are used herein in their usual meaning relative to the force of gravity when a trap is placed with its floor perpendicular to the force of gravity.

The term "side" as used with respect to the traps hereof refers to any face of the internal volume of the trap that is not a front, back or floor.

The term "open" as used with respect to a face of the trap means that there is no wall on that face.

"Substantially open" as used herein with respect to the front of the trap means that solid portions of the front of the trap are disposed so as to be directly over no more than about 50% to about 75% of the area of the floor.

The "internal volume" of the trap is the three-dimensional shape enclosed by the walls of the trap, and if one or more sides are "open," that is, are without walls, the internal volume of the trap is defined by the edges of the walls adjoining the "open" walls.

The term "substantially preventing disengagement of a spider leg" as used with respect to the capability of bug adhesives used herein means that in at least about 75% of cases in which a brown recluse spider's leg is stuck to the adhesive, the spider will not be able to pull the leg free.

The brown recluse spider, *L. reclusa*, is sometimes referred to as the violin or fiddleback spider because of the violin-shaped marking on its dorsum. Although bites are rare, the venom can cause serious wounds and infestations should be taken seriously. The brown recluse spider is most common in the south and central states of the United States, especially in Missouri, Kansas, Arkansas, Louisiana, eastern Texas, and Oklahoma. However, the spider has been found in several large cities outside this range.

Brown recluse (*L. reclusa*) spiders prefer dry, dark, undisturbed places, although they do wander in search of mates and prey items. Although reclusive and shy, they have shown a preference for certain surfaces, such as cardboard, newspaper, and lumber, and other *Loxosceles* species have shown similar preferences (Fischer et al. 2005). Of these choices, cardboard was used in the Example hereof as the most practical and most inexpensive choice for trap construction.

While there are limited options for chemical-free arachnid pest control, glue-traps are one suitable alternative to pesticides. Four novel trap shape designs and one popular glue trap already on the market were tested to determine if one (or more) of the new designs were more likely to catch brown recluse spiders than the existing design. Although this type of trap was most efficient for capturing *L. recluse*, it can pose risks in homes with children and pets for obvious reasons. Among the traps with coverings, the vertical strut trap was most preferred by the spiders, and recommended for homeowners with children and pets.

In the specific embodiments depicted in the Figures, it is to be understood that the specific dimensions and relative dimensions of the traps are not essential features of the traps. The specific and relative dimensions can be feely varied to form a wide range of embodiments within the general parameters specified herein.

In embodiments, a kit for making a trap for spiders and other insects is provided comprising the following components: a flat sheet of a foldable wood product comprising: a back section optionally comprising a slit; a floor section integral with said back section at least partially coated with bug adhesive covered with peel-off paper; a front section integral with said floor section, said floor section comprising openings therein; a tab section integral with said front section sized and shaped, in use, to be folded over the top of the back section, said tab section optionally comprising at least a partial coating of contact adhesive covered with peel-off paper; or said tab section optionally being sized and shaped so as, in use, to fit into said slit in said back section; and instructions for configuring said flat sheet into a three-dimensional spider trap.

A method of making the kit is also comprising: providing a flat sheet comprising front, floor, back and tab sections; coating at least a portion of said floor section with bug adhesive; covering at least said coated floor section with peel-off paper; optionally coating said tab section with contact adhesive and covering said coated tab section with peel-off paper; preparing instructions for peeling off said peel-off paper and folding said flat sheet into a three-dimensional spider trap, wherein said instructions are printed on said flat sheet or provided separately; and packaging said flat sheet and instructions for sale.

A method for making a three-dimensional spider trap from such a kit is also provided comprising: removing said peel-off paper from said bug adhesive on said floor section; folding said back section upward and inward with respect to said floor section to form the trap back; folding said front section upward and inward with respect to said floor section to form the trap front; folding said tab section inward and downward with respect to said trap front to fold over the top of said trap back; and securing said tab to the top of said trap back by: inserting it into said optional slit on the trap back; or peeling said optional contact adhesive from said tab and sticking said tab to the top of the back edge of said front.

Further provided herein is a method for catching a brown recluse spider comprising: Identifying a location where brown recluse spiders are likely to be living; disposing a trap of claim 1 in said area; and allowing said trap to remain in said area until one or more spiders have become stuck to the bug adhesive coating on said trap. To determine whether brown recluse spiders are likely to be living in an area, the following factors should be considered: the area should be defined as the approximate area a brown recluse spider will typically roam over; whether or not a brown recluse spider has been spotted in the area; whether a bite suspected of being a brown recluse spider bite has been experienced by a person in the area; whether the area is located in a geographical region known to be a brown recluse spider habitat; whether the area is an area where humans are likely to go; whether the area provides wood-derived materials as likely brown recluse spider habitats; whether the area provides piles of clothing or rubble likely to provide suitable habitats for brown recluse spiders, and other factors known to the art.

The traps can be left in the area until brown recluse spiders have been captured, or if no spiders are captured within a period of about 14 days, it can be assumed the area is not a significant brown recluse spider habitat.

The traps hereof can also be used to estimate the brown recluse spider population in an area by placing them in an area and counting the number of spiders caught therein over a selected period of time.

Figure 2:
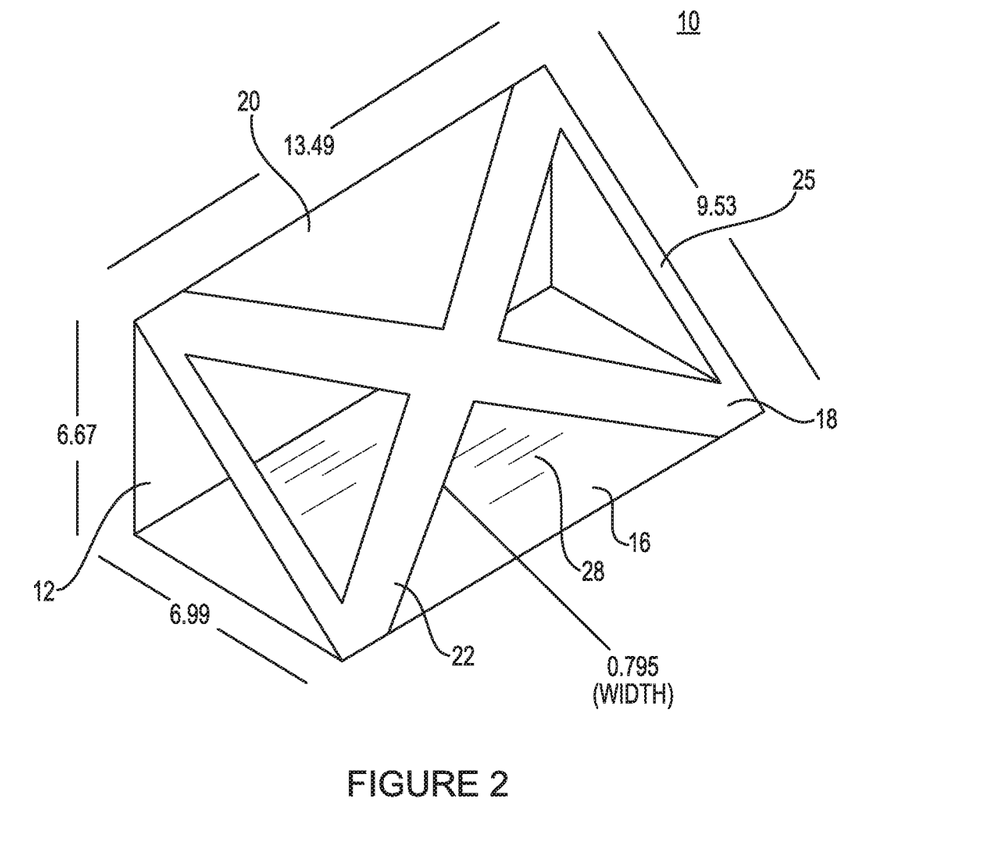
FIG. 2 shows a perspective view of a spider trap hereof having an X-shaped strut design.

FIG. 1 shows a generalized side view of spider traps 10 hereof shown in FIGS. 2-4. In the embodiment shown in FIG. 1, back 12 has a height of 6.83 inches (17.35 cm). Floor 16 has a width of 6.99 inches (17.75 cm). Sides 14 can be present as solid walls, or can be completely or partially open or absent. They are triangular in shape and have a height of 6.83 inches (17.35 cm) and a width of 6.99 inches (17.75 cm). The angle $\alpha$ between back 12 and front 18, and the angle $\varphi$ between floor 16 and front 18 in the embodiment illustrated are about 45°, and the angle $\theta$ between floor 16 and back 12 is about 90°. Front 18 lies on a plane extending from the top of back 12 to the front of floor 16.

FIGS. 2-4 depict traps hereof in which fronts 18 comprise openings of varying shapes and sizes. The solid portions of front 18 can be formed as a single piece or made from separate pieces attached to each other. Sides 14 are open rather than being walls in the embodiments depicted in FIGS. 2-4.

FIG. 2 shows a perspective view of spider trap 10 hereof having an X-shaped or hourglass strut design. The hourglass design is one embodiment of the X-shaped design that includes narrow vertical struts 25 along each vertical edge of front 18. The X-shaped design can include vertical struts 24, or such vertical struts can be absent. In the embodiment depicted, back 12 has a height of 6.67 inches (16.94 cm), a length of 13.49 inches (34.26 cm) and a width of 6.99 inches (17.75 cm). Front 18, which is rectangular in shape, has a length of 13.49 inches (34.26 cm) and a width of 9.53 inches (24.21 cm). Floor 16, coated with a bug adhesive 28, is visible in this view. Solid portion 22 of front 18 comprises triangular openings 20 bounded by solid portions 22. In the embodiment shown, the solid portions forming the "X" have a width of 0.795 inches (2.02 cm) and are connected to or integral with narrow vertical struts 25.

FIG. 3 shows a perspective view of spider trap 10 hereof having a vertical strut design. Floor 16, coated with bug adhesive 28 (shown as dotted lines) is visible in this view. Vertical openings 20a are defined by the solid portion of front 18 which is composed of separate full-length vertical struts 24. In the embodiment shown, back 12 has a height of 6.67 inches (16.94 cm) and a length of 13.49 inches (34.26 cm). Floor 16 has a width of 6.99 inches (17.75 cm) and a length of 13.49 inches (34.26 cm). In the embodiment shown, two narrow vertical struts 25 are disposed at the left and right ends of trap 10, and three wider vertical struts 24 are evenly spaced between them, defining vertical openings 20a. The vertical struts 24 depicted have a length of 8.26 inches (20.98 cm) and a width of 0.25 inches (0.64 cm) and extend from the top of back 12 to the front of floor 16.

FIG. 4 shows a perspective view of spider trap 10 hereof in which front 18 comprises partial-length vertical struts 24a, connected at their lower ends to horizontal bar 26. Floor 16, coated with bug adhesive 28 is visible in this view. Partial-length vertical struts 24a define vertical openings 20a. Horizontal bar 26 is disposed along the bottom of vertical slates 24a, and spaced apart from the front edge of floor 16 so as to define horizontal opening 20b. In the embodiment shown, back 12 has a height of 6.66 inches (16.92 cm) and a width of 13.49 inches (34.26 cm). Floor 16 has a width of 6.99 inches (17.75 cm) and a length of 13.49 inches (34.26 cm). Front 18 has a length of 13.49 inches (34.26 cm) and a width of 9.53 inches (24.21 cm). Horizontal bar 26 has a width of 0.795 inches (2.02 cm) and horizontal opening 20b has a width (vertical height) of 2.54 inches (6.45 cm).

Figure 5:
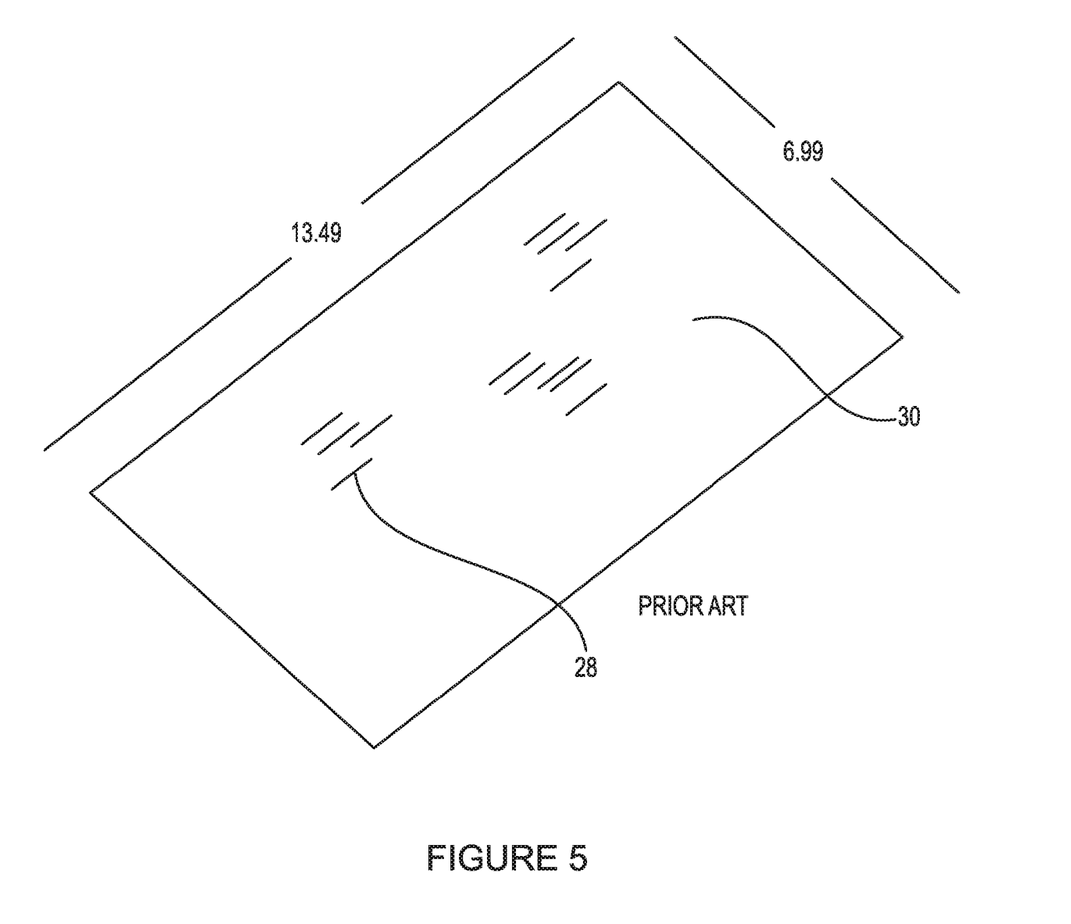
FIG. 5 shows a perspective view of a flat trap design.

FIG. 5 shows a perspective view of a prior art Catchmaster™ flat trap design comprising a flat, rectangular substrate 30 on which bug adhesive 28 is coated. In the embodiment shown, substrate 30 has a length of 13.49 inches (34.26 cm) and a width of 6.99 inches (17.75 cm).

Figure 6:
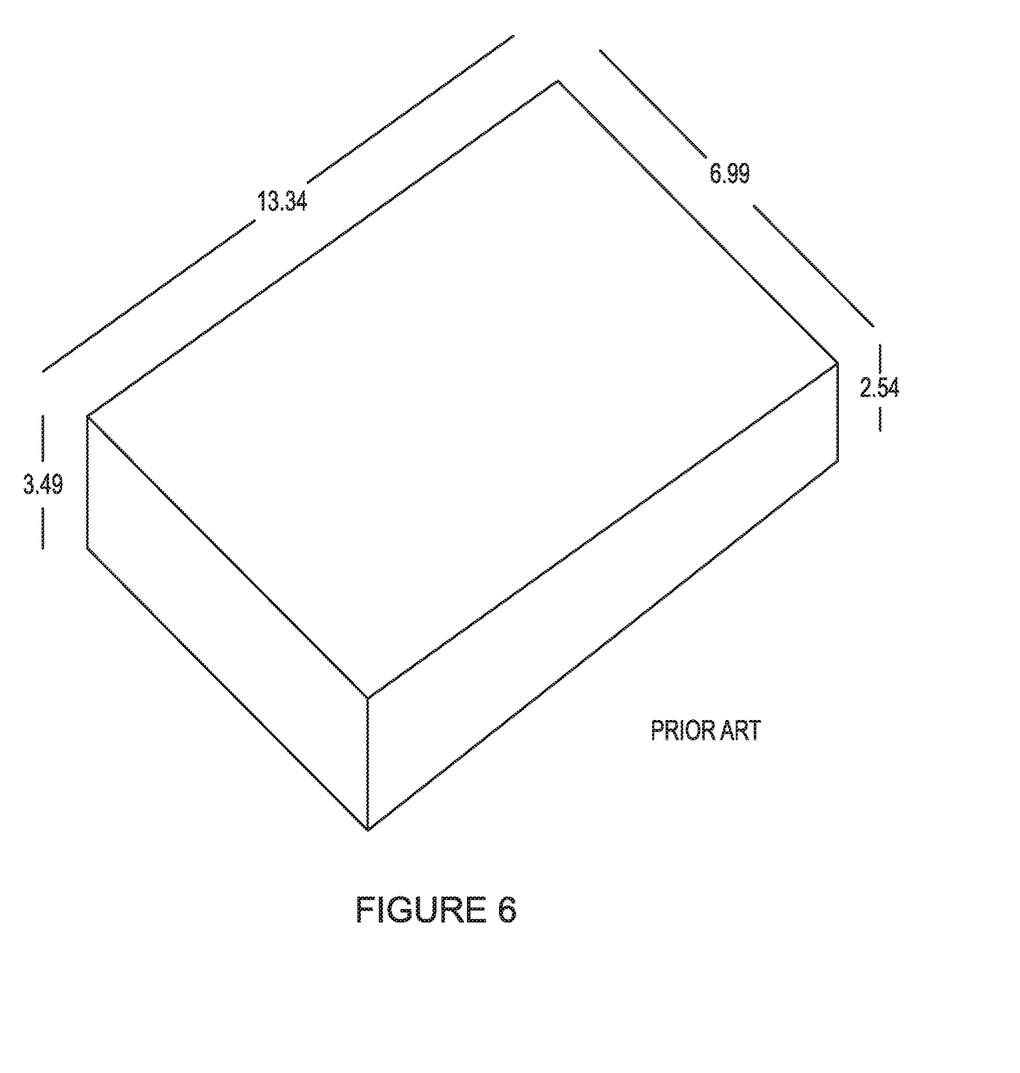
FIG. 6 shows a perspective view of a prior art box trap design used as a control for evaluating the traps hereof.

FIG. 6 shows a perspective view of a prior art Catchmaster™ box trap design used as a control for evaluating the trap designs depicted in FIGS. 2-4. In the embodiment shown, the back of the trap has a height of 3.49 inches (8.86 cm), a length of 13.34 inches (33.88 cm). The front of the trap has a height of 2.54 inches (6.45 cm) and a length of 13.54 inches (34.39 cm).

FIG. 7 illustrates a commercial version of trap 10 hereof that can be packaged and sold in the form of a flat sheet and folded by the customer into a three-dimensional conformation along the horizontal lines depicted between the trap sections. Trap 10 can be mounted on a packaging board 36 for sale. The trap comprises a back section 12, a floor section 16, and a front section 18. Floor section 16 is coated with bug adhesive 28, depicted by dotted lines, and then covered with peel-off paper 32. Front section 18 comprises full-length vertical struts 24 separated by vertical openings 20a. Fold-over tab 34 runs horizontally along the bottom of vertical struts 24 and is coated with contact adhesive 29 and covered with peel-off paper 32.

To use trap 10 shown in FIG. 10, the customer removes it from packaging board 36, and removes peel-off paper 32 from floor 16 and fold-over tab 34. The customer folds back 12 upward and inward to about a 90° angle and folds front 18 inward and upward so that the top of front 18 is adjacent to the top of back 12, leaving floor 16 horizontal and allowing tab 34 to extend beyond the top of back 12. The customer then folds tab 34 down so that contact adhesive 29 thereon secures it to the top of the outside edge of back 12. This creates a three-dimensional trap structure which can be placed in a suitable area for trapping spiders.

EXAMPLES

Example 1. Spider Trap Construction

It was hypothesized that glue traps employing cardboard would be suitable for attracting and trapping *Loxosceles reclusa* spiders. The motivation of this study was to determine improved three-dimensional shape(s) of cardboard traps for catching brown recluse spiders. Although reclusive and shy, *L. reclusa* have shown a preference for certain surfaces, such as cardboard, newspaper, lumber, and other *Loxosceles* species have shown similar preferences (Fischer et al. 2005). Of these choices, cardboard was chosen as the most practical and inexpensive choice for trap construction.

The effectiveness of several three-dimensional glue-trap shapes for trapping *Loxosceles reclusa* Gertsch and Mulaik (Araneae: Sicariidae), was investigated using four novel glue-trap shape designs, which were compared to an existing design currently on the market. These four novel and one standard shape designs were tested using pairwise comparisons. The most effective trap design was a flat glue-trap with no covering. The next most-effective trap was a trap with a front face comprising full-length parallel vertical struts. The trap comprising partial-length vertical struts with a horizontal bar was the third most effective embodiment.

Materials and Methods

All *L. reclusa* used in this study were caught in central or south-central Missouri, USA. While in the laboratory, they were fed a diet consisting of domestic house crickets (*Achetus domesticus*) and various species of shorthorned grasshoppers. A mixture of adult and juveniles spiders were used. Glue-trap designs were made using modified Catchmaster™ glue traps (catchmaster.com) cut into 6.67×13.49 cm rectangles and laser-produced cardboard cutouts from The Center for Rapid Product Realization at Western Carolina University.

The experimental roofed traps used 0.03" non-corrugated chipboard pad cardboard (Uline, uline.com) laser cut to the specifications shown in FIGS. 1-4. There were a total of five trap designs: flat (6.67×13.49 cm rectangle with no cardboard attached, FIG. 5), and traps with fronts having X-shaped (hourglass) struts (FIG. 2) full-length vertical struts (FIG. 3), partial-length vertical struts with a horizontal bar near the bottom (FIG. 4), and regular Catchmaster traps (FIG. 6), which were used as the control. The base of the trap was the same (6.67×13.49 cm rectangle) in each of the five designs.

For a paired comparison of traps, two spiders of the same gender and/or age group (males with males, females with females, juveniles with juveniles) were placed into a plastic bin measuring 30.48×45.72×30.48 cm and left to acclimate for approximately 12 hours. At that point, two traps of different designs were placed in the bin, one on either end, about 2.54 cm from the wall. Spiders were left for another 12 hours, and at the conclusion of that period, it was noted in which trap, if any, the spiders were caught. Each trap pairing was tested at least 50 times. Only spiders that did not choose a trap during their first experiment were used again. The experimental comparisons were performed in a laboratory setting to cut down on external stimuli that might have influenced trap choice, such as odors, air currents, temperature, etc.

Statistical Analysis

A Bradley-Terry model was fitted for paired comparisons in SAS© 9.2 (sas.com) with PROC LOGISTIC and PROC GENMOD, where ties (spider prefers neither trap) are removed. The Deviance and Pearson Goodness-of-Fit Statistics in PROC LOGISTIC yield p-values of 0.09 and 0.10 respectively, the Hosmer-Lemeshow p-value is 0.21, and the Lagrange Multiplier Statistic for non-intercept in PROC GENMOD yields a p-value of 0.03, which suggests that there may be a problem with the fit of the Bradley-Terry model.

Results and Discussion

The estimated preference probabilities obtained from the fitted model are listed in Table 1.

TABLE 1

Estimated preference probabilities obtained from the fitted model.

| Preferred trap design | Design preferred over | p |
|---|---|---|
| X | Vertical | 0.43 |
| | Horizontal | 0.45 |
| | Flat | 0.25 |
| | Control | 0.5 |
| Vertical | Horizontal | 0.53 |
| | Flat | 0.31 |
| | Control | 0.58 |
| Horizontal | Flat | 0.29 |
| | Control | 0.55 |
| Flat | Control | 0.75 |

The probabilities suggest the following ordering of the five traps for catching *L. reclusa* (least preferable to most preferable): Control<X trap<horizontal bar trap<vertical strut trap<flat trap.

In addition to the possible problem with the model mentioned above, there was a fairly high percentage of ties in the data set (Table 2).

TABLE 2

Number of Trials and Ties

| Comparison | Number of Trials | Number of Ties |
|---|---|---|
| X vs. Vertical | 55 | 23 |
| X vs. Horizontal | 58 | 23 |
| X vs. Flat | 63 | 16 |
| X vs. Control | 50 | 13 |
| Vertical vs. Horizontal | 51 | 12 |
| Vertical vs. Flat | 50 | 13 |
| Vertical vs. Control | 50 | 9 |
| Horizontal vs. Flat | 55 | 9 |
| Horizontal vs. Control | 50 | 3 |
| Flat vs. Control | 50 | 14 |

As a result, an extended Bradley-Terry analysis that adjusted for ties was implemented in SAS. Here, a tie was interpreted to mean that each trap receives one-half of a choice. For example, assume that 50 trials were performed for a pair of traps, and the first trap was chosen 23 times, the second trap was chosen 22 times, and neither trap was chosen 5 times. In the adjustment for ties, pseudo-data were generated, where the first and second traps were chosen 25.5 and 24.5 times, respectively. Turner and Firth (2012) find that this simple and intuitive approach to handling ties works well in practice and generally yields results very similar to those obtained from much more sophisticated analyses, which have the disadvantage of being much harder to implement and interpret.

A Bradley-Terry model for paired comparisons was fit with the pseudo-data values in SAS. The Deviance and Pearson Goodness of-Fit Statistics in PROC LOGISTIC yielded p-values of 0.17 and 0.18 respectively, the Hosmer-Lemeshow p-value was 0.35, and the Lagrange Multiplier Statistic for non-intercept in PROC GENMOD yielded a p-value of 0.06. Obtaining insignificant p-values for each of the four goodness-of-fit procedures suggests that the extended Bradley-Terry model fits the data well.

The estimated preference probabilities obtained from the adjusted analysis are listed in Table 3.

TABLE 3

Estimated Preference Probabilities Obtained from the Adjusted Analysis

| Preferred trap design | Design preferred over | p |
|---|---|---|
| X | Vertical | 0.45 |
| | Horizontal | 0.47 |
| | Flat | 0.32 |
| | Control | 0.51 |
| Vertical | Horizontal | 0.52 |
| | Flat | 0.36 |
| | Control | 0.56 |
| Horizontal | Flat | 0.34 |
| | Control | 0.54 |
| Flat | Control | 0.69 |

The probabilities yielded the following ordering of the five traps for catching *L. reclusa* (least preferable to most preferable): Control<X trap<horizontal bar trap<vertical strut trap<flat trap.

In summary, analyses that excluded ties and analyses that included ties agreed on the same ordering of the traps. The flat trap was chosen more than the other traps in the pairwise comparisons (Table 4).

TABLE 4

Trap Comparisons

| Trap Pairings | X | Vertical | Horizontal | Flat | Control |
|---|---|---|---|---|---|
| X vs. Vertical | 22% | 36% | | | |
| X vs. Horizontal | 24% | | 32% | | |
| X vs. Flat | 16% | | | 56% | |
| X vs. Control | 46% | | | | 28% |
| Vertical vs. Horizontal | | 36% | 40% | | |
| Vertical vs. Flat | | 30% | | 44% | |
| Vertical vs. Control | | 44% | | | 38% |
| Horizontal vs. Flat | | | 14% | 72% | |
| Horizontal vs. Control | | | 54% | | 40% |
| Flat vs. Control | | | | 46% | 26% |

However, the flat trap was the least user-friendly trap of those tested, since there was no barrier to prevent accidental glue contact from non-arthropod victims such as children, pets, etc. The other traps had some type of cardboard "roof" over the glue part, serving as a physical deterrent for unwary or inquisitive animals and/or children. The standard, unmodified control trap design performed poorly against all of the modified designs, even though it had a much larger glue perimeter (55.88 cm) and glue surface area. Exposed glue perimeters for the X, all vertical, vertical with horizontal bar, and flat traps were 18.42, 17.78, 19.69, and 36.83 cm, respectively. Perimeter comparisons can yield only a partial explanation for the differences in trap selection, because the flat trap had 53% more exposed perimeter than the other modified traps, yet it was chosen 14% more often than the horizontal bar trap design. It also outperformed the control trap, which had 66% more exposed perimeter than the flat trap. Also, the cardboard backs and struts on the other three modified traps may have facilitated spider escape, as there was no glue on those areas. The experimental roofed traps were constructed of chipboard cardboard, a different material than the commercial roofed traps, so the different results obtained with the experimental traps vs. the commercial traps cannot be ascribed solely to different design shapes.

Example 2. Comparison of Vertical Trap with Flat Traps

The objective of this study was to compare the performance of the vertical spider trap of the present invention with three commercial glue traps, Catchmaster (spider and insect trap, catchmaster.com/wpcproduct/mouse-insect-glue-boards/), PIC (GMT-2F Mouse Glue Board, amazon.com/PIC-GMT-2F-Mouse-Board-2-Pack/dp/B0037Z1F9A), and Tomcat (Glue Board, tomcatbrand.com/glue_boards.html). Materials and methods were as described in Example 1 except that the present vertical trap was tested against the three competing flat traps and 100 trials were conducted. In 41 of the 100 trials no spider was caught. Results are provided in Table 5.

TABLE 5

Comparison of Vertical Trap with Flat Glue Traps

| Type of Trap | Vertical (This Invention) | Catchmaster Rectangular box | PIC Triangular prism (solid front, back and floor) | Tomcat Rectangular box |
|---|---|---|---|---|
| No. of trials in which spider was caught | 21 | 17 | 14 | 7 |

The results show superior performance by the novel vertical trap hereof.

The foregoing illustrates spider traps hereof and methods and kits for making them, as well as methods of catching spiders and reducing spider populations in indoor areas. The descriptions, examples and illustrations provided are not intended as an exhaustive description of every possible embodiment covered by the claims. Art-known and obvious equivalents to elements, components structures, parameters, and method steps are included within the scope of this invention which is defined by the attached claims.

REFERENCES

U.S. Pat. No. 4,048,747, F V Shanahan et al., issued Sep. 20, 1977 for Baseboard Trap for Crawling Insects.
U.S. Pat. No. 4,052,811. E B Shuster, issued Dec. 11, 1977 for Insect Catching Device.
U.S. Pat. No. 4,244,134, H J Otterson, issued Jan. 13, 1981 for Disposable Pest Trap.
U.S. Pat. No. 4,324,062, F A Schneider, issued Apr. 13, 1982 for Human Insect Trap for the Live Capture of Spiders and the Like.
U.S. Pat. No. 4,608,774, DA Sherman, issued Sep. 2, 1986 for Construction for Roach Traps.
U.S. Pat. No. 4,819,371, HL Cohen, issued Apr. 11, 1989 for Insect Traps.
EP 0 659 339 B1, Nitto Denko. Published Jun. 28, 1995, for Adhesive insect trapping housing.
U.S. Pat. No. 5,513,465, S W Demarest, et al., issued May 7, 1996 for Method and Apparatus for Catching Insects.
WO 9615664, D G Anderson. Published May 30, 1996, for Light Trap for Insects.
U.S. Pat. No. 5,572,825. M J Gehret, issued Nov. 12, 1996 for Glue Trap.
U.S. Pat. No. 5,649,385 M J Acevedo, issued Jul. 22, 1997 for Insect Trap and Method.
U.S. Pat. No. 6,786,001, AGSP Piper et al. issued Sep. 7, 2004 for Insect Trap.
US2005/0138858. W. Lyng Published Jun. 30, 2005 for Trap for Crawling Insects.
US2005/0279016, W. Lyng Published Dec. 22, 2005 for Floating Aquatic Emergence Trap.
EP 2 347 759 A2, de VGen. N V, Published Jul. 27, 2011 for Methods for controlling pests using RNAi.
U.S. Pat. No. 8,341,873, S. Frisch, issued Jan. 1, 2013 for Portable Insect Trap.
Anderson, P. 1982. Necrotizing spider bites. Practical therapeutics. 26(3): 198-203.
Big-H Trap bighproducts.com/traps.htm, downloaded Jul. 9, 2013.
Brown Recluse Spider Traps p. 5, brown-recluse.com/ Downloaded Jul. 9, 2013.
Catchmaster Catalog pages. Catchmaster.com, Downloaded Jul. 19, 2013.
Catchmaster Glue Boards, catchmasterglueboards.com downloaded Jul. 18, 2013.
Catchmaster Mouse and Insect Glue boards, catchmaster.com/wpcproduct/mouse-insect-glue-boards/, downloaded Aug. 4, 2014.
Davis, H N. et al. Residual effect of insecticide treatment plus use of sticky traps on brown recluse spiders (Araneae: Sicariidae) on two surfaces, Toxicon. In Press.
Elzinga. R. J. 1977. Observations on the longevity of the brown recluse spider, *Loxosceles reclusa* Gertsch and Mulaik. J. Kansas Entom. Soc. 50(2): 187-188.
Fischer M A. Vasconcellos-Neto J. 2005. Microhabitats Occupied by *Loxosceles intermedia* and *Loxosceles laeta* (Araneae: Sicariidae) in Curitiba. Paraná. Brazil. Journal of Medical Entomology 42(5): 756-765.
Gladney. W. J., and C. C. Dawkins. 1972. Insecticidal tests against the brown recluse spider. J. Econ. Entomol. 65: 1491-1493.
Hagstrum D W. Dowdy A K. Lippert G E. 1994. Early detection of insects in stored wheat using sticky traps in bin headspace and prediction of infestation level. Environmental Entomology 23: 1241-1244.
Hite, J M. et al. 1966. The biology of the brown recluse spider. Arkansas Experiment Station, Bulletin 711, p. 1-26.
Norment, B. R. and T. L. Pate. 1968. Residual activity of diazinon and lindane for control of *Lorosceles reclusa*. J. Econ. Entomol. 61: 574-575.

PIC Mouse Glue Board, amazon.com/PIC-GMT-2F-Mouse-Board-2-Pack/dp/B0037Z1F9A, downloaded Aug. 4, 2014.

Sandidge, J. S. 2003. Scavenging in brown recluse spiders. Nature 426: 30.

Sandidge J S, Hopwood J L. 2005. Brown recluse spiders: A review of biology, life history and pest management. Transactions of the Kansas Academy of Science 108(3): 99-108.

Schenone, H., et al. 1970. Prevalence of *Loxosceles laeta* in houses in central Chile. Am. J. Troup. Med. Hyg. 19: 564-567.

Stropa A A. 2010. Effect of architectural angularity on refugia selection by the brown spider, *Loxosceles gaucho*. Medical and Veterinary Entomology 24: 273-277.

Tomcat Glue Boards, tomcatbrand.com/glue_boards.html, downloaded Aug. 4, 2014.

Turner H, Firth D. 2012. Bradley-Terry Models in R: The BradleyTerry2 Package. Journal of Statistical Software 48(9): 1-21.

Vetter, R S, Barger D K. 2002. An infestation of 2.055 brown recluse spiders (Araneae: Sicariidae) and no envenomations in a Kansas home: Implications for bite diagnosis in regions of North America where the spider is not endemic. Clinical Infectious Diseases 39(6):948-951. 2002.

Zurek. L. 2005. Spiders and Scorpions. Kansas State University Agricultural Experiment Station and Cooperative Extension Service. MF-771: 1-3.

What is claimed is:

1. A spider trap comprising:
    a floor;
    a back wall disposed at an angle θ to said floor, and extending upward from a back edge of said floor;
    a front wall extending from a front edge of said floor to an upper edge of said back wall, wherein the front wall is disposed at an acute angle φ to said floor and an acute angle α to said back wall, said front wall comprising at least one opening therein, wherein the at least one opening is sized to allow passage of a spider through the at least one opening and the at least one opening is rectangular in shape, wherein said front wall consists essentially of vertical struts entirely spanning the height of the front wall and spaced apart along the width of the front wall to create said at least one opening; and
    a bug adhesive coating on at least a portion of said floor capable of sticking to a spider leg and capable of preventing disengagement of a spider leg therefrom,
    wherein the floor, the back wall, and the front wall form an open-ended triangular prism having two triangular ends, wherein the two triangular ends are completely open.

2. The spider trap of claim 1 wherein said floor, said back wall and said front wall are rectangular in shape.

3. The spider trap of claim 1 wherein said angle θ between said floor and said back wall is between 80° and 100°, said vertical struts extend from the front edge of the floor to the top edge of the back wall, and said at least one opening has a width of between 0.5 and 1.5 inches (between 1.27 and 3.81 cm).

4. The spider trap of claim 1 wherein said angle α between said back wall and said front wall is between 35° and 55°.

5. The spider trap of claim 1 wherein said angle φ between said floor and said front wall is between 35° and 55°.

6. The spider trap of claim 1 comprising structural components made from or having one or more outer surfaces comprising wood or a material made from wood.

7. The spider trap of claim 1 comprising structural components comprising a material selected from the group consisting of natural wood, cardboard, corrugated cardboard, newspaper, and chipboard.

8. A method of making a spider trap of claim 1 comprising providing a floor having front and back edges;
    coating or partially coating said floor with a bug adhesive capable of sticking to a spider leg and capable of preventing disengagement of a spider leg therefrom;
    providing a back wall having a top edge and a bottom edge, sized and shaped so as to be capable of being fastened to the back edge of said floor;
    fastening the bottom edge of said back wall to the back edge of said floor such that the back wall is disposed at an angle θ to said floor;
    providing a front wall having a top edge and a bottom edge, said front wall comprising at least one opening therein and being sized and shaped to engage the top edge of said back wall, wherein the at least one opening is sized to allow passage of a spider through the at least one opening and the at least one opening is rectangular in shape, wherein said front wall consists essentially of vertical struts entirely spanning the height of the front wall and spaced apart along the width of the front wall to create said openings;
    disposing the top edge of the front wall next to top edge of the back wall so that the front wall forms an angle α with the back wall, and fastening the top edge of the front wall to the top edge of the back wall; and
    disposing the bottom edge of the front wall next to the front edge of the floor so that the front wall forms an angle φ with the floor, and fastening the bottom edge of the front wall to the front edge of the floor wherein, when assembled, the floor, the back wall, and the front wall form an open-ended triangular prism having two triangular ends, wherein the two triangular ends are completely open.

9. The method of claim 8 wherein the front wall is rotatably attached to the back wall.

10. A kit for making a spider trap comprising:
    a flat sheet of a foldable wood product comprising:
        a back wall section optionally comprising a slit;
        a floor section integral with said back wall section, wherein said floor section is at least partially coated with bug adhesive covered with peel-off paper;
        a front wall section integral with said floor section or integral with said back wall section, said front wall section comprising at least one opening therein, wherein the at least one opening is sized to allow passage of a spider through the at least one opening and the at least one opening is rectangular in shape, wherein said front wall consists essentially of vertical struts entirely spanning the height of the front wall and spaced apart along the width of the front wall to create said at least one opening;
    wherein, when assembled, the floor, the back wall, and the front wall form an open-ended triangular prism having two triangular ends, wherein the two triangular ends are completely open and
    instructions for configuring said flat sheet into a three-dimensional spider trap.

11. The kit of claim 10, wherein the front wall section further comprises a tab section sized and shaped to engage a top edge of the back wall section, said tab section optionally comprising at least a partial coating of a contact adhesive covered with peel-off paper or said tab section optionally being sized and shaped so as to fit into said slit in said back wall section.

12. The kit of claim 10, wherein the front wall section further comprises a tab section sized and shaped to engage a front edge of said floor section, said tab section optionally comprising at least a partial coating of a contact adhesive covered with peel-off paper.

13. A method for catching a brown recluse spider comprising:
- disposing a trap of claim 1 in an area; and
- allowing said trap to remain in said area until one or more spiders have become stuck to the bug adhesive coating on said trap.

* * * * *